United States Patent

Foerster

[11] Patent Number: 6,097,190
[45] Date of Patent: Aug. 1, 2000

[54] METHOD AND DEVICE FOR LOCATING AND IDENTIFYING SEARCH OBJECTS CONCEALED IN THE GROUND, PARTICULARLY PLASTIC MINES

[75] Inventor: Friedrich Martin Foerster, Pfullingen, Germany

[73] Assignee: Institut Dr. Friedrich Foerster Pruefgeraetebau GmbH & Co. KG, Reutlingen, Germany

[21] Appl. No.: 08/977,288

[22] Filed: Nov. 24, 1997

[30] Foreign Application Priority Data

Nov. 26, 1996 [DE] Germany ............................ 196 48 833

[51] Int. Cl.⁷ ............................... G01V 3/11; G01V 3/165
[52] U.S. Cl. .............................................................. 324/329
[58] Field of Search ...................... 324/329, 326, 324/327, 328, 66, 67, 228, 234, 239, 243, 345; 89/1.13; 342/459

[56] References Cited

U.S. PATENT DOCUMENTS

| | | |
|---|---|---|
| 4,563,644 | 1/1986 | Lenander et al. . |
| 4,719,426 | 1/1988 | Weiss . |
| 5,307,272 | 4/1994 | Butler et al. . |
| 5,452,639 | 9/1995 | Aulenbacher et al. . |
| 5,680,048 | 10/1997 | Wollny ..................... 324/329 |
| 5,719,500 | 2/1998 | Eschner et al. ........... 324/329 |

FOREIGN PATENT DOCUMENTS

| | | |
|---|---|---|
| 2 514 153 | 4/1983 | France . |
| 34 32 847 | 3/1986 | Germany . |
| 40 36 123 | 5/1992 | Germany . |
| 41 03 216 | 8/1992 | Germany . |
| 43 33 121 | 5/1994 | Germany . |
| 42 42 541 | 6/1994 | Germany . |
| 44 23 623 | 1/1996 | Germany . |
| 44 23 661 | 1/1996 | Germany . |
| 44 36 078 | 4/1996 | Germany . |
| WO 87/04801 | 8/1987 | WIPO . |

*Primary Examiner*—Jay Patidar
*Attorney, Agent, or Firm*—Alston & Bird LLP

[57] ABSTRACT

A method for locating and identifying search objects concealed in the ground under a ground surface is described. Preferred search objects are plastic mines, which inter alia contain a plastic body and at least one metallic part, particularly an igniter. Firstly the position of the metallic part is established, preferably with an eddy current probe. Then a search area surrounding the part is investigated by means of a ground probe, which produces a ground signal indicating the presence of ground material. The ground signal is evaluated in position discriminating manner. Preferably the ground probe and metal probe are identical, which is e.g. made possible by an operation of the eddy current probe with at least three different frequencies and a suitable signal evaluation. Prior to the investigation of the search area the electrical conductivity and/or magnetizability of the ground can be increased by impregnating with a liquid, which can contain salt water and/or magnetizable particles. A portable mine searching device is also described, in which at the lower end of a supporting rod is located a probe carrier casing, within which the eddy current search coil system is guided in reciprocating manner.

35 Claims, 3 Drawing Sheets

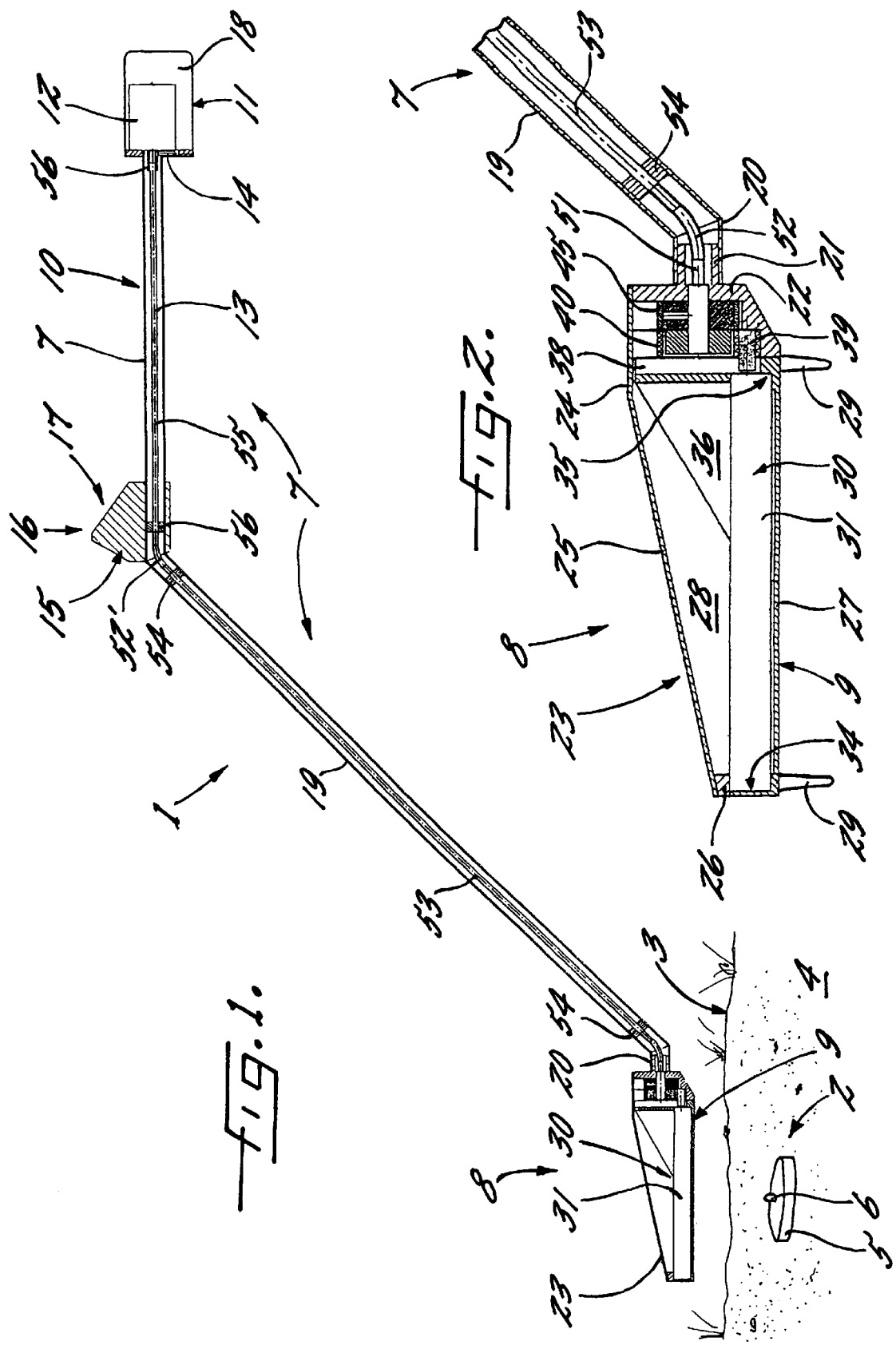

METHOD AND DEVICE FOR LOCATING AND IDENTIFYING SEARCH OBJECTS CONCEALED IN THE GROUND, PARTICULARLY PLASTIC MINES

TECHNICAL FIELD

The invention relates to a method and a device for locating and identifying search objects concealed in the ground close to or under the surface thereof and which have at least one part made from an electrically conductive material, particularly metal. A search object can also have at least one body formed from substantially electrically non-conductive, non-magnetic material, on or in which the conducting part is located. The material of the body is typically plastic. Preferred search objects are mines, particularly plastic mines.

DESCRIPTION OF THE BACKGROUND ART

The surface-near area of the ground is in many regions of the world contaminated with foreign bodies as a result of industrialization and military activities. Thus, e.g. throughout the world there are large areas which are contaminated with mines, unexploded shells and other still dangerous war material. In particular plastic mines, which as a result of their low price have been buried or covered with soil in inhabited and uninhabited areas by the warring parties, represent a constant danger for the life and limb of humans and animals.

The ground is often impregnated and/or covered with splinters, projectiles, cartridge cases and other metallic articles such as nails, bottle and can closures, etc., which comparatively speaking are less dangerous.

Plastic mines, mainly designed as anti-personnel mines, are particularly vicious, because they are very difficult to refind. Normally they are close to the ground surface, e.g. being concealed in vegetation such as grass, but are generally buried to a depth of 10 to 15 cm. Plastic mines are generally largely made from plastic and may be completely free from metal. However, in many plastic mines small parts such as igniters are made from metal. At present search methods specifically responding to plastic are unavailable. Therefore plastic mines are frequently detected with the aid of metal probes on the basis of the metal parts in such mines.

Metal-free mines cannot be found by means of metal probes. The effectiveness of the search for plastic mines with the aid of metal probes is consequently greatly impaired by the fact that sensitive metal probes respond to any metal parts without it being possible to directly gather from the search signal what type of metal is involved, how large the metal fragment is and whether it is a harmless metallic fragment, nail, crown cork, etc. or a metal part of a plastic mine. Only in the latter case would evacuation and/or rendering safe operations be necessary. To increase the efficiency in the search and elimination of mines, it is therefore necessary to reduce the false alarm rate.

The problem of the invention is to provide a method and a device making it possible to differentiate harmless metal parts concealed close to or in the ground from in particular plastic mines. Preferably it is also to be possible to identify plastic mines on the basis of their type.

SUMMARY OF THE INVENTION

According to the method of the invention, there is firstly a determination of the position of the part comprising an electrically conductive, particularly metallic material. This is followed by an investigation of the search area surrounding the position of the part with at least one ground or surface probe producing a ground or surface signal and sensitive to the ground material or soil. It is constructed in such a way that the body brings about a signal differentiatable from the ground signal and preferably no signal. The search area, whose lateral extension is preferably less than 1 meter, includes the said part. Simultaneously with or in time-staggered manner with the investigation, there is a position discriminating evaluation of the ground signal.

The aim of the invention is not to create or use a probe sensitive to the material or other specific characteristics of the body. It is in fact based on the finding that where the body is located in the ground, there can be no ground or material or soil. A volume area surrounding the metal part in which there is no ground material and no electrically conductive material, will in all probability be filled with electrically non-conductive material, particularly plastic. A ground material-free excavation or cavity, i.e. the lack of ground material in a clearly defined spatial relationship to the location of a metal part is consequently used as an indication of the presence of a plastic mine. The area surrounding the metal part can be investigated substantially in the horizontal and/or vertical direction and an exclusively horizontal testing may be adequate.

The initial determination of the position of the metal part makes it possible to limit the lateral extension of the search area to be tested with the ground probe to the region immediately around the part. This can significantly increase the surface capacity in searching for mines and therefore the effectiveness thereof, because completely metal-free regions of the search area cannot have any plastic mines with metal parts and consequently may not require any further investigation. However, if it is assumed that in a search area either in addition to other mines or also exclusively entirely metal-free mines are concealed, there is no need for the determination of the position of the metal part. The search area can then merely be tested from the outset with the ground probe, without it being preceded by a search for metal parts.

For the determination of the position of the part it is possible to use random methods with adequate sensitivity for in particular metallic materials such as steel and other iron compounds. For example, it is possible to use magnetic field probes, which utilize the influence of ferromagnetic parts on the earth's magnetic field for the detection of the parts. Preferably, determination takes place inductively through a metal probe, which has at least one inductive search coil system. A preferred example of a search coil system allowing a precise detection of the position, is described in DE 44 23 661.

For the investigation of the search area, it is e.g. possible to use methods, where a two or three-dimensional imaging of the entire search area at a given time is produced. At the same time information is recorded from many and preferably all locations in the search area. It is e.g. possible to use an imaging infrared sensor incorporated e.g. into an infrared camera. Temperature differences between the ground and the body not generally in thermal equilibrium with it are determined and optionally rendered visible.

Preferably investigation takes place through the scanning of the search area, i.e. by time-staggered information acquisition from several locations in the search area. Scanning can take place manually, e.g. in that a probe is manually moved to and fro over the search area. Preferably scanning takes place automatically, which is advantageous for a better evaluation of the signals. The scanning of the search area can take place electromagnetically, e.g. in infrared-optical manner or by a surface penetrating radar. It is also possible to use acoustic methods, particularly using ultrasonics. It is also possible to combine several methods based on different principles, whose informations are preferably summated.

Preferably the investigation, particularly the scanning, takes place inductively by means of a ground probe, which has at least one inductive search coil system. The latter can be constructed in the manner described in DE 44 23 661 A1. In the latter method an eddy current probe is used as the ground probe. Use is made of the fact that there is a certain electrical conductivity and/or magnetizability in the surface-near area of the ground in many regions of the earth. These characteristics are in particular based on the presence of water, particularly salt water, and/or the presence of iron compounds in the soil.

In conventional mine searching, said soil characteristics generally give rise to disturbing background signals, which may have to be suppressed with special operating and evaluating processes. However, the signal sensitivity is reduced in the case of soil signal suppression. There is consequently a risk of mines being "overlooked" or not found. Examples of processes for suppressing surrounding signals are described in international patent application WO 87/04801 and Swedish specification 82 02 094-2. The fundamental principle can be described in the following way.

An inductive search coil system movable in the vicinity of a search object to be detected is operated with two different excitation frequencies f1 and f2. Different materials, as a function of their characteristics (e.g. electrical conductivity, permeability) act in characteristic manner on the impedance of the receiving coil of the search coil system. The impedance of the receiving coil changes for each material in characteristic manner with the frequency. This leads to a correspondingly modified receiving coil signal corresponding to an a.c. voltage. The coil signal can be represented as a vector or pointer in a complex voltage plane, which contains on the X-axis, at the angle 0°, the real part of the coil signal or a corresponding frequency and on the Y-axis, at an angle of 90°, the imaginary part of the coil signal. In practice, these signals, which correspond to a real voltage or an imaginary voltage, in analog-functioning processes can be e.g. formed by a phase-controlled rectification of the coil signal with respect to the primary current flowing through a transmitting coil of the search coil system.

Said disturbance variables can produce spurious signals, which are 100 times higher than the wanted signal produced by the search object. Voltages caused by magnetizable soil, are essentially directed towards the imaginary axis. Electrically conductive environments produce spurious signals largely in the direction of the real axis. In order to suppress the disturbance variables, the phase for the controlled rectification can be set perpendicular to the disturbance variable, so that the coil signal is projected onto the axis perpendicular to the disturbance variable.

The spurious signals have a different frequency dependency to the metal signals. At different frequencies metals lead to different contributions to the receiving coil voltage. If e.g. only the difference of the imaginary voltages is evaluated at two different excitation frequencies, through this subtraction the influence of magnetizable soil can be largely reduced to zero. The ratio between the wanted and spurious signals rises sharply, because through the subtraction the main disturbance forces are simultaneously suppressed, because the imaginary differential signal DIm is evaluated in the direction of the imaginary axis and the conductivity fractions in the direction of the real axis are suppressed. In similar manner the difference of the real parts DR at two frequencies can be utilized for evaluation in the suppression of ground or soil signals. In these two-frequency methods known in the mine search field, ground signals are suppressed in the described way, so that a search coil system operated with two frequencies is able to respond particularly sensitively to metal parts, because much stronger ground signals are suppressed.

The use of an inductive search coil system as the ground probe, compared therewith takes a different, new and unusual path, in that the ground signal hitherto suppressed as a spurious signal in mine searching is utilized for acquiring information on the ground or soil in the search area and therefore on possible search objects such as plastic mines which may be present.

For producing a ground signal by means of an eddy current probe, the following procedure can be adopted. In a signal evaluating device connected to the receiving coil are formed at least one imaginary differential signal DIm and at least one real differential signal DR. In place of the hitherto conventional, separate evaluation of one or other signal, in the signal evaluating device a combination signal is formed from at least two differential signals of the type DIm or DR, the combination signal preferably differing from a simple linear combination. The combination signal can e.g. correspond to the quotient of the differential signals DIm and DR. This combination signal makes it possible for the first time to form a conductivity signal proportional to the conductivity of the search object material and which corresponds to the quotient of the self-inductance and resistance of the search object material. With the aid of this factor or signal it is possible to form a coupling signal GI, which is specific to the search situation in question (nature and structure of the search coil system, distance from the search object, resistance R2 and self-inductance L2 of the search object) and represents the magnetic couplings between the transmitting coil, search object and receiving coil, as well as the self-inductance of the search object. With respect to the imaginary axis and the frequency f1, the coupling signal GI can e.g. be formed in the following way:

$$GI=DIm/(G*(1/(S+1)-V21^2)/(S+V21^2))$$

with $G=FI1*f1*I11$, in which $I11$ is the amplitude of the primary current of the component of the first frequency f1 and FI1 is a gain factor, which can also be equal to 1: $S=(R2/(f1*L2))$; $V21=f2/f1$. This factor GI, not determinable with any of the hitherto known methods and which in the signal evaluating device corresponds to a corresponding analog or digital signal, makes it possible to establish the voltage fraction for a given frequency produced by the metallic search object from a projected overall coil signal, which contains both ground signals and also search object signals. A thus projected metal signal can be formed with respect to the imaginary axis and the frequency f1 in the following way: $UI1=(GI/FI1)*G*(1/S+1))$. This metal fraction, optionally after multiplication with a frequency-specific gain factor can be subtracted from the imaginary or real part of the overall voltage associated with the corresponding frequency for precision adjustment purposes. Thus, by subtraction a ground signal is obtained. Corresponding ground signals can be formed for all the frequencies used, in each case for the imaginary axis and for the real axis, and can be used for evaluation purposes.

Thus, e.g. when searching for mines, environmental conditions can occur, in which the interference or spurious signals caused by the conductive and/or magnetizable soil are so high that in practice either only imaginary differential signals of the DIm type or only real differential signals of the DR type can be used for metal detection. A determination of the conductivity by the division of DIm and DR is then in certain circumstances impossible. The difficulties can be overcome by adding at least one further frequency component of the exciting current or primary current in accordance with at least one further discreet frequency f3, which differs from the first frequency f1 and the second frequency f2. As in the already described methods, real and imaginary projecting signals can also be formed with respect to the third frequency. A projection signal can be multiplied with a multiplication or gain factor, so that optionally weighted projection signals are obtained. For further processing use is either made of weighted projection signals, which all correspond to a real signal or all correspond to an imaginary signal. From pairs of weighted projection signals of a common type (real or imaginary signal), it is then possible to form e.g. a first projection differential signal with respect to the frequencies f2 and f1 and at least second projection differential signal with respect to the frequencies f3 and f1. With the aid of the at least one additional third frequency, it is consequently possible, with respect to one fraction (real or imaginary fraction) to in each case form two or three or even more projection differential signals.

According to the three-frequency method, as well as methods with even more than three frequencies, it is e.g. possible to produce two different signals of the DIm type or two different signals of the DR type. These signals can in each case be individually used for metal detection and/or metal identification and e.g. the channel with the better wanted-spurious signal ratio can be used for further evaluation. It is particularly advantageous if a projection combination signal is formed, which is formed by a combination of at least two projection differential signals. If the projection combination signal is formed from the quotient of two projection differential signals, then from the combination signal once again a conclusion can be drawn concerning the conductivity of the corresponding materials and from it can be deduced a ground signal.

In multifrequency methods with more than two frequencies, it is advantageously possible to choose between an evaluation in the imaginary direction and an evaluation in the real direction, so that during evaluation it is possible to choose the direction allowing a better disturbance suppression.

A projection combination signal can also be formed by a summation of the values or magnitudes of at least two projection differential signals in an adder of an analog circuit or a microprocessor or the like. Magnitude signals can also be formed from differential signals of the DIm or DR type and further processed.

In the case of ferromagnetic, metallic materials the angle between the real axis and the voltage vector represents the product of permeability and electrical conductivity. This fact can be taken into account if at least one and preferably two components of the primary current I1 have a low frequency f0, which is smaller than 1 KHz, preferably between 50 and 500 Hz and in particular at approximately 100 Hz.

Through the use of low frequencies transformation signals can be obtained. By means of a transformation signal it is possible to carry out a transformation of the coil signal with a ferromagnetic signal fraction into a transformed coil signal without said fraction. The further evaluation of the transformed coil signal can then take place in the manner already described. The determined permeability can be indicated in analog and/or digital manner as a measured value. The metal type can be directly indicated by means of corresponding assignment tables. This information can be compared with the conductivity information, so that possible ambiguities can be avoided.

If no magnetic disturbance sources are present, a single low frequency f0 can be adequate. If there are magnetic disturbance sources present, preferably use is made of at least two different low frequencies and in analogy to what has been described up to now a corresponding imaginary differential signal of two low frequencies can be formed. Thus, disturbances through magnetizable disturbance sources are suppressed. The real parts of the voltages induced by the two low frequencies can be used for suppressing conductive soil and salt water and for forming the transformation signal.

For obtaining a position discriminating ground or soil signal the search area is scanned in a preferred method. Scanning takes place in that a spatially variable electromagnetic alternating field penetrating the ground of the search area is produced and in that the alternating field change brought about by the electrically conductive and/or magnetizable soil is detected and transformed into a position discriminating soil correlated with the spatial alternating field change.

It is e.g. possible to scan the search area in such a way that the ground probe is moved relative to the search area, preferably substantially parallel to the ground surface along a search path, which preferably contains the region of the part. The search path can be a straight line, along which the ground probe is moved either once in one direction or optionally several times backwards and forwards. The ground signal is then present in the form of a line scan, the line having a finite length and preferably in its centre can contain the position of the part. The search path can also be a line, which results from a superimposing of a linear, first movement and a linear, second movement, which is preferably at right angles to the first movement, the search probe preferably being moved along a meandering search path with straight search path portions. It is in this way possible to scan a surface with a plurality of preferably parallel and in particular linear line scans. It is also possible for the search path to be a line, which results from a superimposing of at least one, portionwise linear, first movement and an arcuate, particularly circular second movement. The ground probe can be e.g. located on a linearly movable, rotation-limited or fully rotatable rotor eccentric to its rotation axis and/or linearly, preferably radially movable on the rotor.

Whereas the aforementioned scanning requires a movement of at least one transmitting coil or field coil of the ground probe relative to the search area, it is also possible for the testing, particularly the scanning of the search area to take place in such a way that a ground probe with an inductive search coil system with at least two independently controllable, spatially separated transmitting coils and at least one receiving coil is positioned in fixed manner with respect to the search area and that by supplying different currents in a preferably periodic sequence to the spatially separated transmitting coils a spatially variable, electromagnetic alternating field is produced. This preferably has a substantially constant amplitude and changes its direction substantially continuously with a speed corresponding to said sequence or a repetition frequency in the case of a periodic sequence. The alternating field changes brought about by the soil are converted by the receiving coil into a ground signal correlated with the spatial change. This method makes it possible for the search area and therefore the region around the metallic part to be "illuminated" from different directions. It can e.g. be a linear, to and fro alternating field or, when there are at least three transmitting coils arranged in mutually circular manner, a rotating excitation field.

The position discriminating evaluation of the ground signal can take place in such a way that said ground signal through at least one signal evaluating device self-transmitting with the ground probe, e.g. linked by cable or radio, is automatically associated with the ground probe position fixable by locating means or, in the last-mentioned method, the direction of the alternating field spatially varying in the case of stationary transmitting coils. The ground signal can be transformed at the same time or in time-staggered manner for at least one search object imaging. The search object imaging can take place, optionally following the storage of the data representing the position discriminating ground signal, in a preferably electronic memory, on a temporary, single or two-dimensional record support and/or on a permanent, flat record support such as a sheet of paper, said record support having an imaging surface corresponding to the search area. Imaging on a screen, e.g. a LCD screen is possible and preferred. The imaging of the search object can also take place in a single or two-dimensional field of light emitting diodes, in which e.g. the intensity and/or the colour of the light is correlated with the strength of the ground signal. If the investigation also delivers depth informations, it is also possible to produce a pseudo-three-dimensional imaging of the search area. For example, a scan can be "focussed" on different depths and the depth informations can be represented in one or two-dimensional manner, i.e. linearly or in disk-like manner.

An amplification of the ground signal producible by an eddy current probe and therefore an increase in the "contrast" between soil-filled and hollow or plastic-filled volume areas can be obtained in that, prior to the testing, particularly scanning, the electrical conductivity and/or magnetizability of the ground or soil is increased. This in particular can take place in that the soil in the search area is impregnated with a liquid increasing the electrical conductivity and/or magnetizability of the soil. This method step can take place both before and after determining the position of the part, but preferably after. For increasing the electrical conductivity of the soil the liquids can contain dissolved mineral substances and in particular the liquid can be salt water, which can optionally be drawn from the sea. Alternatively or additionally the liquid can be a dispersion of ferromagnetic and/or ferrimagnetic particles in water, particularly salt water. The liquid can be sea water mixed with ferrite particles. Generally such liquids do not constitute a burden on the environment.

This contrast increasing soil preparation can in particular improve significantly the efficiency of the method in very sandy soils, e.g. in desert regions. The soil preparation can be carried out immediately prior to testing, but also well ahead, such as weeks or months prior to the actual mine search. It can in particular serve as a preparation of the soil for a search for completely metal-free mines. The step of determining the position of the metal part can then optionally be dropped.

The impregnation of the soil can preferably take place by spraying and/or watering the soil with the liquid. Soil-assisted impregnating devices can be used, which e.g. have liquid containers and pouring mechanisms and optionally nozzles, etc. The impregnation of the soil can take place from the air with the aid of a manned or unmanned aircraft. It is preferable to use helicopters or aircraft. In particular, firefighting aircraft can be used, which can take up water in flight from rivers, lakes or seas and which are optionally equipped with mechanisms allowing a mixing of the water with salt and/or said magnetic particles.

The invention also proposes a detecting device for locating and identifying search objects of the above-described type. The detecting device is in particular suitable for performing the method according to the invent ion. It has at least one probe carrier, which has at least one metal probe sensitive to electrically conductive material and at least one ground probe for the testing or investigation, preferably scanning of a search area surrounding the part and producing a position discriminating ground signal. Preferably the ground probe is movable relative to the probe carrier. There is at least one signal evaluating device connected in signal-transmitting manner to the ground probe for the position discriminating evaluation of the ground signal. The metal probe preferably has at least one inductive search coil system. Although, as described, the ground probe can operate according to other than inductive methods, preference is given to such a probe which has at least one inductive search coil system with at least one transmitting coil and at least one receiving coil.

The metal probe and ground probe can be differently constructed in accordance with their task and can e.g. differ in size, the number of transmitting and receiving coils, the number of conductor windings, the manufacturing type (e.g. wire windings or printed conductors). They can be arranged in spatially separated manner. An advantageous embodiment is characterized in that the inductive search coil system of the metal probe and the inductive search coil system of the ground probe are formed by the same inductive search coil system. If constructions can be particularly small and light and makes use of the fact that an inductive search coil system is usable according to different operating modes or evaluating processes or the probe signal on the one hand as a metal probe and on the other as a ground probe. This is made possible through the described application to the transmitting coil of the search coil system of at least two and preferably at least three different excitation frequencies or transmitting frequencies and by an evaluation of the signal applied to the receiving coil in the complex voltage plane.

A search coil system can be simultaneously supplied with different excitation frequencies. For this purpose the transmitting coil of the search coil system is connected to an excitation current source, which is constructed for the production of preferably a sinusoidal alternating current of a discreet, first frequency and at least one discreet, second frequency differing from the first frequency. For the alternating operation of the inductive search coil system as a metal probe on the one hand and a ground probe on the other, it is possible to provide corresponding switching means for switching the signal evaluating device between these two modes.

It is also possible for the corresponding evaluations to be performed in parallel and to image the results at the same time or at least in a common imaging. Preferably three or more than three different frequencies are produced. Preferably at least one of the frequencies is between 10 and 1000 Hz, particularly at approximately 100 Hz. Signals of such low frequencies can be used in the case of ferromagnetic parts to separate the influence of magnetizability from the influence of the electrical conductivity on the coil signal.

A detecting device can be moved as a whole in order to bring about the ground probe movement and said probe is in this case fixed to the probe carrier. It is also possible for the inductive search coil system of the ground probe to have at least two spatially separated transmitting coils and for the excitation current source to be so constructed that the transmitting coils are controlled in a preferably periodic sequence with different currents, so that the resultant electromagnetic alternating field for a substantially constant amplitude preferably continuously changes its direction with a repetition frequency corresponding to said sequence.

Advantageously the probe carrier has probe guidance means, which are constructed for guiding the search coil system of the ground probe relative to the probe carrier along a search path oriented substantially parallel to the ground surface. The probe guidance means can have at least one linear guide and/or at least one rotation element rotatable about a rotation angle of preferably 360° and on which the search coil system of the ground probe is located eccentrically to the rotation axis orientable at right angles to the ground surface. The rotation element can e.g. be a windscreen wiper-like swivel arm with a rotation angle e.g. limited to 180° or a fully rotatable rotor, preferably in the form of a disk. On the rotation element can be provided a linear guide preferably running radially to the rotation axis for the search coil system of the ground probe. On an optionally linearly movable, rotary disk can be provided with a preferably identical radial spacing from the rotation axis a metal probe and a ground probe separated therefrom. In the case of a slow advance of the rotary disk they can alternately run along substantially the same search path.

The probe carrier can be located on a manned or unmanned vehicle. This is particularly advantageous with large and/or heavy ground probes and is appropriate if different detection methods are used with a correspondingly comprehensive, but method-specific equipment. According to a further development of the invention, the probe carrier can be carried by one or more persons and preferably has carrying aids, particularly in the form of at least one supporting rod or the like fitted to the probe carrier. In the case of an embodiment handlable by a single person, the probe carrier is located at the lower end of a supporting rod. The weight of the probe carrier with the probe is preferably less than 20 kg, particularly less than 10 kg. Its horizontal dimensions are preferably approximately 1 meter, particularly less than 60 cm. A portable probe carrier construction can in particular be implemented if the metal probe and ground probe are constructed as inductive probes and if preferably both probes are formed by the same inductive search coil system, whose different operating states or signal evaluation processes allow them to act firstly as a metal probe and secondly as a ground probe.

The concept of the probe carrier is to be understood in a broad sense, so that the probe carrier can also be constructed as a suitably shaped holder holding the probes, e.g. on a vehicle or on a supporting rod. Preferably the probe carrier has a substantially closed casing, which is roughly rectangular in ground plan and which preferably has a substantially planar, optionally removable bottom. The search coil system is preferably located within the casing and is consequently protected against damage and/or dirt. Within the casing there is at least one linear guide preferably running parallel to the casing bottom and in which the search coil system is guided in a linearly movable manner.

As the search area may contain an explosive, pressure-sensitive and/or contact-sensitive mine, an unintended triggering of the mine when searching the ground must be avoided. Thus, preferably there are support means for the fixed supporting of the probe carrier and probes in a distance above the ground surface. The support means are preferably fitted to the probe carrier. If e.g. the probe carrier has preferably removable or hinged support means projecting downwards over the casing bottom for the fixed supporting of said bottom at a distance above the ground surface, then the probe carrier can be positioned in fixed manner above the ground and is not in con tact with the latter. The support means can preferably be constructed in the form of beads, webs or feet with small-surface support areas located in the marginal region of the casing bottom or probe carrier. Thus, no pressure is exerted in the vicinity of the metal part and therefore possibly in the vicinity of the mine. Moreover, the distance between the ground surface and the probe remains constant during testing, which has a positive effect on the reproducibility and evaluatability of the signals.

The probe guidance means can comprise at least one belt drivable by e.g. a shaft and revolving parallel to a linear guide and which has a laterally projecting bolt. The latter can engage in a slot running perpendicular to the linear guide on a support for the search coil system. To avoid disturbing influences on the probes of the probe guidance means and drive means, it is advantageous if at least the belt and/or the bolt and/or the shaft are largely made from non-magnetic, electrically non-conductive material, particularly plastic. It is particularly advantageous if, with the exception of the conductors of the search coil system and the electric cables, all components of the probe carrier are largely metal-free.

The shaft drive means can be placed on or in the probe carrier. However, in order to avoid probe interference as a result of the drive, the latter can also be remote from the probes and preferably located on the upper end of the supporting rod and can in particular be constituted by an electric motor. The shaft can be guided externally along the connecting rod to the probe carrier. However, preferably the connecting rod is internally hollow and the shaft preferably runs within said rod. Although the connecting rod can also be made from metal, e.g. aluminium, it is preferably made from an electrically non-conductive material, especially fibre-reinforced plastic. Th is also avoids interference to in particular moving, inductive probes and ensures a low weight of the overall detecting device.

These and further features can be gathered from the claims, description and drawings and individual features, both singly or in the form of sub-combinations, can be implemented in an embodiment of the invention and in other fields and can represent advantageous constructions.

BRIEF DESCRIPTION OF THE DRAWINGS

Embodiments of the invention are described relative to the attached drawings, wherein show:

FIG. 1 A side view in section of a portable mine searching and identifying device.

FIG. 2 A side view in section of the probe carrier of the device of FIG. 1 on a larger scale.

DETAILED DESCRIPTION OF THE PREFERRED EMBODIMENT

Figure 3:
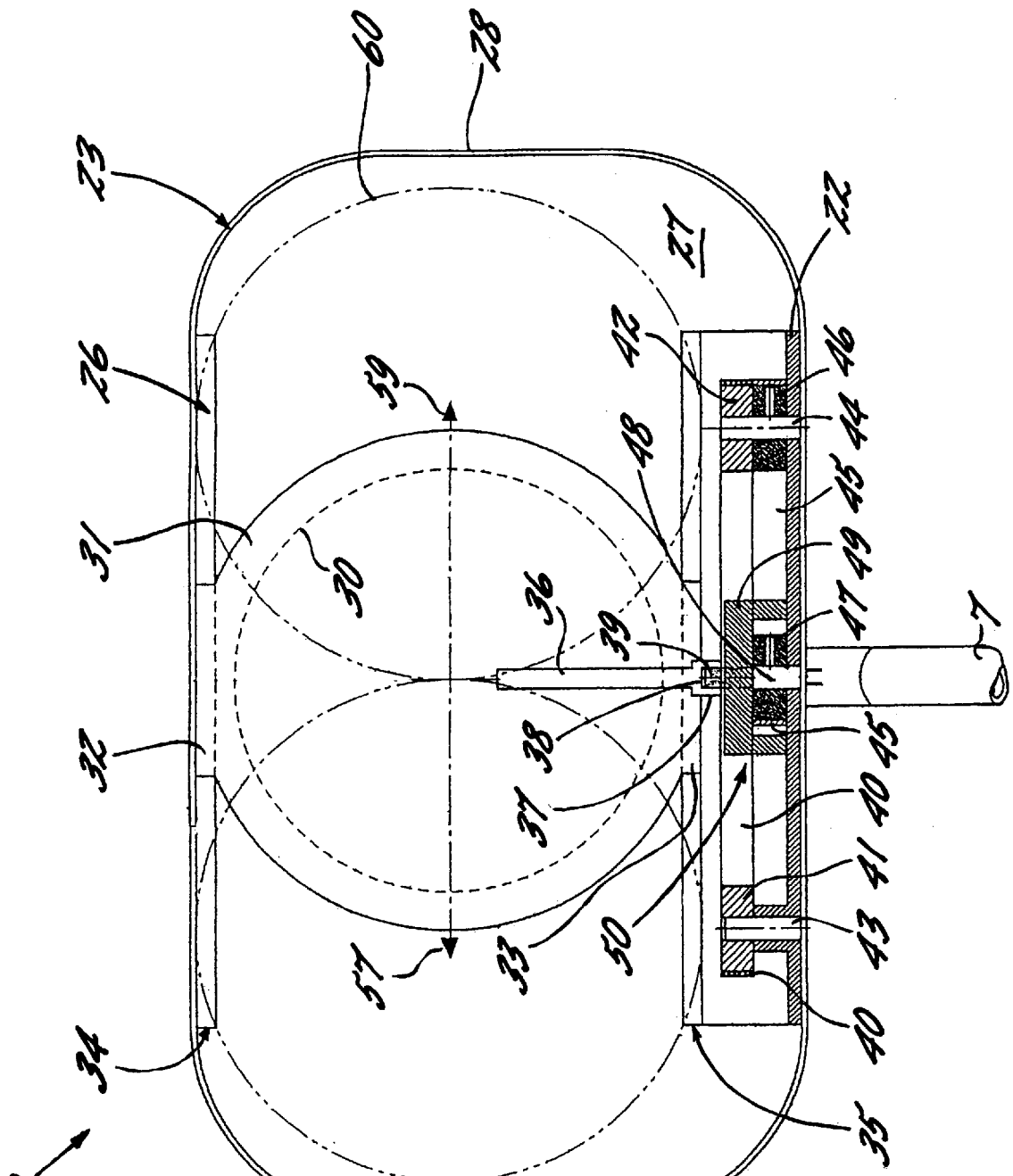
FIG. 3 A plan view in section of the probe carrier of FIGS. 1 and 2.

FIG. 1 shows a detecting device for the location and identification of search objects constructed as a portable mine searching device 1. It can in general be used for metal seeking purposes. The preferred application is searching for mines, especially plastic mines. Thus, FIG. 1 shows a search object constructed as plastic mine 2, which is buried approximately 10 cm below the surface 3 in the ground 4.

The very diagrammatically represented plastic mine 2 has a substantially plastic, plate-like body 5 and in centrally arranged manner a metallic igniter 6 reacting to pressure.

The mine searching and identifying device 1 has a probe carrier 8 located at the lower end of a twice bent carrying or supporting rod 7, whose underside 9 is held a few cm above the ground surface 3. The supporting rod 7 is formed by an internally hollow fibre-reinforced PVC tube, which is light and twisting-resistant. The supporting rod 7 has an upper portion 10 to be held substantially horizontally and whose longitudinal axis is parallel to the planar underside 9 of the probe carrier 8. To the rear end of the upper supporting rod portion 10 is fixed a mains-independent, battery or accumulator-operated electric motor 12 in a watertight plastic casing 11 with its driven axis coaxial to the central axis 13 of the upper portion 10. The casing 11 also contains the electronics of the signal evaluating device. A synchronizing unit 14 acting on the driven shaft of the electric motor 12 serves to determine the rotation position of the driven axis.

To the front end of the upper portion 10 is fixed a mine searching device display and control unit 16 housed in a watertight plastic casing 15. A flat display and control panel 17 (FIG. 4) inclined rearwards by an angle of approximately 40° with respect to the axis 13 enables the user to adjust the operating parameters of the mine searching device and to follow and check the search results. The display and control unit is connected by not shown electrical connection means to the electric motor 12 and the signal evaluating electronics arranged in moistureproof and dirtproof manner in the casing 11.

To the front end of the upper portion 10 is connected a central portion 19 of the connecting rod 7 inclined forwards at an angle of approximately 45° and to which can be fitted in some embodiments an adjustable handle for holding and the better guidance of the mine searching device. To the lower end of the central portion 19 is connected a short, lower portion 20 of the connecting rod 7 running parallel to the upper portion 10.

As can be more easily gathered from FIG. 2, in a front opening of the lower portion 20 of the connecting rod 7 is inserted a lug 21, which is constructed in one piece with a vertical, wide rear wall 22 of the probe carrier 8. The lug 21 is secured by screws in the lower portion 20, so that the probe carrier 8 is detachably connected to the connecting rod 7.

The rear wall 22 forwardly chamfered in the lower region has steps here on its top and is made from twisting-resistant plastic and forms a carrying element of a moisturetight casing 23 of the probe carrier 8. The casing 23 has a forwardly oriented, upper wall 24 fixed to the top of the rear wall 22 at right angles thereto and to which is connected a forwardly inclined, planar cover 25. In the represented embodiment the latter is articulated to the upper wall 24, but can also be completely removable and can e.g. be screwed down. The cover permits easy access to the interior of the casing, e.g. to replace search coils or carry out repairs. The cover 25 is located in the vicinity of its leading edge on a correspondingly chamfered, upper bearing surface of the casing front wall 26, whose height is less than that of the rear wall and which with its front side runs parallel to the rear wall. The front wall 6 and rear wall 22 are connected at the bottom by a substantially planar casing bottom 27. The casing is laterally closed by side walls, whereof FIGS. 1 and 2 only show the inside of the right-hand side wall 28. To the underside 9 of the casing 23 are fitted two hinged feet 29 in FIG. 2, which in the hinged or flapped in state are lowered into the bottom region of the casing. The hinged feet 29 are fixed on the right-hand side 28 in the vicinity of the rounded corners of the casing. Together with the invisible hinged feet on the facing corners, they support the probe carrier 23 on the ground surface 3, which leads to a fixed installation of the casing relative to the ground, a substantially constant spacing between casing and search coil system and ground surface being ensured.

An inductive search coil system 30 is placed inside the casing 23. The search coil system is constructed on a flat, round carrier made from electrically non-conductive plastic in the form of conductors, which are applied to the carrier in the thick film process. Search coil systems with wire windings are also possible. In the represented search coil system 30, several planar layers exist corresponding to electrically interconnected conductors vertically separated by electrically insulating plastic plates. As can be seen in FIG. 3, the search coil system with the carrier has a substantially circular shape and on the front and back of the carrier 31 of the search coil system are constructed extensions 32, 33, which have edges running parallel to the front wall 26 or rear wall 22.

The front extension 32 of the search coil system carrier 31 engages in a guide groove 34 of the front wall 26 open towards the rear wall. The rear extension 33 engages in a guide groove 35 of the rear wall 22 open towards the front wall 26. Thus, the guide grooves 34, 35 form a linear guide running parallel to the casing bottom 27, in which the carrier with the search coil system is guided in a linearly movable, tilt-free manner. Between the guide grooves the carrier 31 floats freely in a space above the casing bottom, which is advantageous for a low-resistance movement of the carrier 30 in the guides 34, 35.

To the carrier 31 is fixed a substantially plate-like, wedge-shaped, forwardly chamfered wedge element 36 standing perpendicular to the carrier plane and which inter alia serves to stiffen the support or carrier system and which in the vicinity of its trailing edge has a widened cross-section. In the widened portion 37 is formed a guide groove 38 open towards the rear wall 22 and running perpendicular to the guide grooves 34, 35 or to the casing bottom 27. In substantially lateral clearance-free manner, a round plastic bolt 39 engages in the guide groove 38 and is fixed in a loop, which is vulcanized onto the outside of a rubber toothed belt 40 passing parallel to the rear wall or guide grooves 34, 35. The toothed belt 40 runs over axially parallel rotatable plastic wheels 41, 42 mounted in rotary manner on lateral bolts 43, 44 fixed to the rear wall 32 and directed towards the front wall. Parallel to the toothed belt 40, a much shorter toothed belt 45 runs on its side facing the rear wall 22 and is guided on two plastic wheels 46, 47. The outer right plastic wheel 46 is connected in non-rotary manner to the plastic wheel 42 and mounted in rotary manner on the bolt 44. The central wheel 47 is a pinion and is fixed in non-rotary manner to a plastic central bolt 48. The bolt 48 is double supported, firstly in a round bore of the rear wall 22 and secondly in a front wall 49 running parallel to the rear wall on the underside of the central wheel 47 of a plastic bearing part 50 for the central wheel 47 which appears U-shaped in plan view. The front wall 49 of the bearing part 50 is located substantially within the inner space surrounded by the front toothed belt 40.

The central bolt 48 is the furthest forward part of a shaft driving the belts and has a rear, cylindrical shoulder 51, which can be seen in FIG. 2. Onto the shoulder 51 is mounted a flexible plastic hose portion 52, whose other end is mounted on the front end of a straight, round plastic shaft 53. As can be seen in FIG. 1, the central portion 53 of the shaft is straight and in the area close to its ends is guided in rotary manner by a cylindrical plastic bearing element 54, which completely fills the interior of the connecting rod 7 and provided with a central, round passage opening. FIG. 1 also shows that on the upper end of the shaft 53 is fitted a further, flexible plastic hose piece 52, whose other end is fitted on the front end of an upper shaft portion 55. The shaft portion 55 is constructed like the shaft portion 53 and is guided in the vicinity of its front end by a bearing element 56. The rear end of the upper portion 55 of the shaft is connected in non-rotary manner by means of a coupling sleeve 56 with the driven shaft of the electric motor 12 and coaxially to the latter. The belt drive of the probe guidance means is consequently connected in force-transmitting manner via a flexible shaft with the drive 12 remote from the search coil system.

If necessary, when using the mine searching device 1, the search coil system 30 is brought into the central position shown in continuous line form in FIG. 3. This operating state can be established with the aid of a synchronizing unit 14 forming a locating means for the probe 30 and can be displayed in the display 17. In this operating state, the mine searching device, like the prior art devices can be used by an operator 8, in that he pivots it backwards and forwards at a distance above the ground surface 3, slowly advancing and observing the display 17. The mine searching device is so set that the eddy current probe formed by the search coil system 30 is used as a metal probe. The presence of a metal fragment is indicted optically and/or acoustically by means of corresponding indicating or display devices of the display and control unit 16, which can also have a loudspeaker and/or a headphone connection.

However, at this time it is not possible to gather from the signal whether the metal part is a harmless crown cork or the like or a metallic part of a plastic mine. In conventional mine seeking this would optionally have to be followed by a marking of the suspected location or a prior investigation of the search area by digging or the like. The resulting time delay makes the mine search ineffective, because the false alarm rate, particularly in the case of sensitive metal probes, can be very high.

A searching device using the invention avoids these disadvantages. If a metal signal is detected, initially the probe carrier with the preferably centrally arranged search coil system is centred very well over the suspected location. The probe carrier can then be placed on the ground, the feet 29 ensuring a fixed installation and a certain, constant spacing between the search coil system and the search object. The signal evaluating device can be so set or modified, that the search coil system 30 can be used as a ground probe for producing a ground signal. On switching on the electric motor 12, its driven shaft starts a rotary movement, which is transferred by the shaft portions 53, 55 and the flexible adaptors 52, 54 to the central bolt 48, whose rotation is transferred via the central wheel 47 and rear toothed belt 45 to the outer, right wheel 46 and from the latter to the plastic wheel 43 fixed thereon and which rotates on the bolt 44. The rotary movement is transferred to the toothed belt 40 engaging in slip-free manner in corresponding teeth of the pinion 42, so that the bolt 39 fixed thereto revolves with the toothed belt 40.

Starting from the situation shown in FIG. 2 with the bolt 39 located on the underside of the toothed belt 40, the bolt, e.g. considered from the probe carrier or connecting rod 7, moves to the left in the direction of arrow 57. As the bolt engages in the vertical guide groove 38 of the search coil carrier 31, the latter is also moved in direction 57. When the bolt reaches the left plastic wheel 41 it starts to revolve upwardly around it, which brings about a movement component upwards in the direction away from the casing bottom 27. In the left apex of this revolving movement the probe carrier 31 has reached the furthest left outer position 58 (shown in broken line form). On further revolution of the bolt the latter again moves vertically upwards into the guide groove and moves the search coil system in the opposite direction 59 at a maximum up to the right outer position 60 of the search coil system carrier. The rotary movement of the shaft 53 is consequently transformed into a linear movement of the search coil system operated as a ground probe and alternately in opposite directions. In this way, the ground can be investigated or scanned along the line 57, 59. In the embodiment, the length of the line precisely corresponds to the diameter of the carrier 31.

Figure 4:
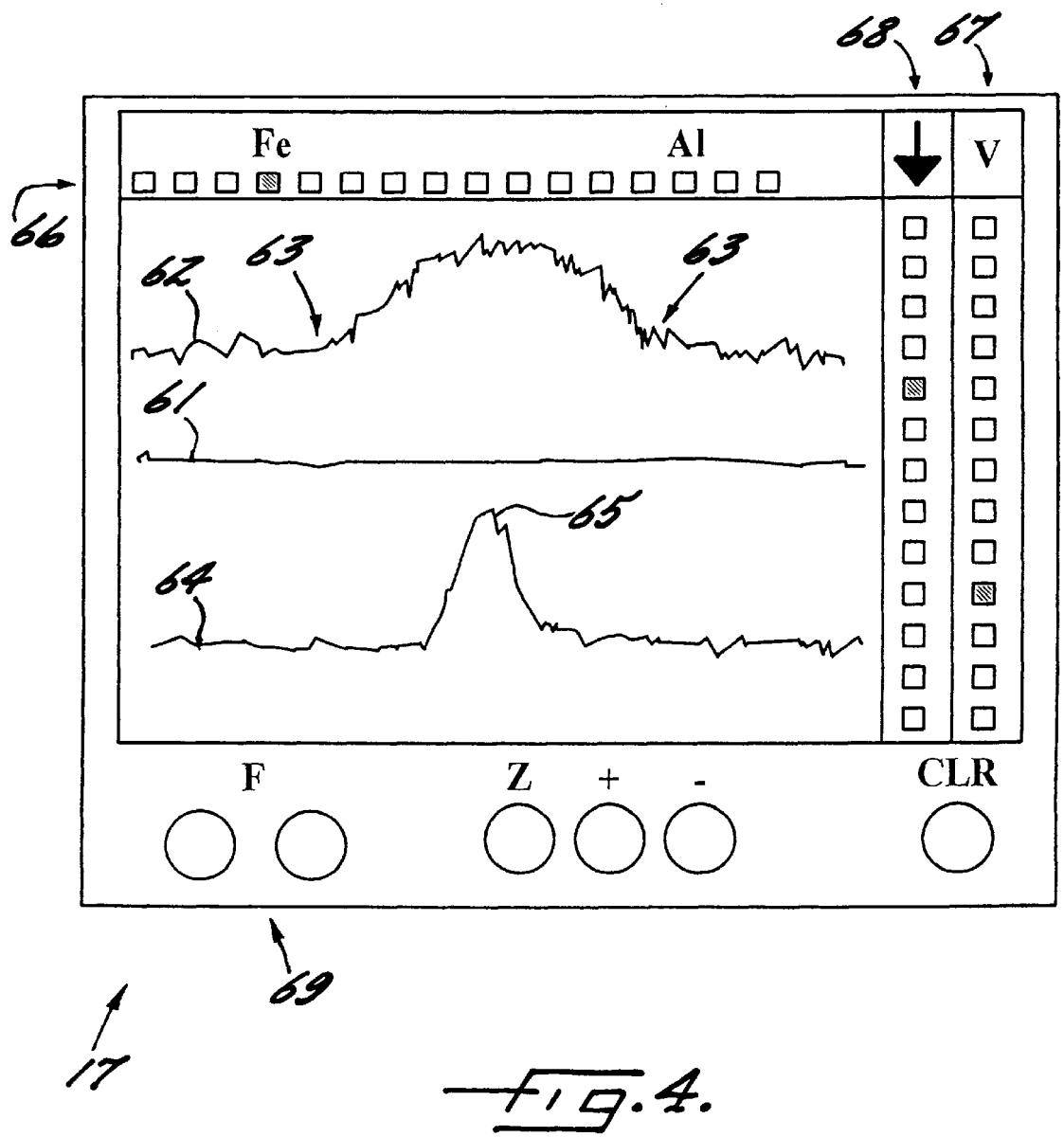
FIG. 4 A plan view of a display and control panel of the device shown in FIGS. 1 to 3.

The result of the line scan can e.g. be represented in the LCD display, shown in FIG. 4, of the display and control unit 17 in the form of "overflow curves". The central line scan 61, drawn in only for explanation purposes, shows a ground signal, as is produced by substantially homogeneous soil or ground. The signal strength of the ground signal remains substantially constant along the entire line. The upper line scan 62 represents the strength of the ground signal, if there is a soil-free excavation in the centre of the line scan and which probably houses a plastic mine. An attenuation of the ground signal corresponds to an upward rise of the line. In the area between the points 63 the ground signal has an attenuation running roughly symmetrically to the centre. The points 63 of the start of attenuation can be roughly identified with the outer edge of a plastic mine. Between the edges there is a soil-free "excavation", which is filled by the plastic of the mine. The ground signal is attenuated here. For example, by switching the operating mode back to the use of the search coil system as a metal probe, the lower line scan 64 shown in FIG. 4 can be recorded for control purposes. In the vicinity of the centre of the plastic mine assumed to be located between points 63, this metal signal has a peak 65 with a half-width, which is much lower than that of the ground signal 62 between the points 63. The metal signal 64 indicates the presence of a metal part in the centre of the assumed plastic mine. The lack of soil material indicated by the overflow curve 62 in a spatially defined environment of the metal fragment indicated by the overflow curve 63 can be evaluated as an indication of the presence of a plastic mine.

If the metal fragment indicated by the signal peak 65 is a harmless fragment not surrounded by plastic, then the ground signal would appear like the central line scan 61. In such a case the search could be continued without any further delay, because the metal piece not surrounded by a soil-free excavation can be identified as a false alarm with respect to the mine search. The signal e.g. comes from a crown cork.

Since with the aid of the described multifrequency method, it is also possible to produce signals proportional to the conductivity of discovered metal pieces, the conductivity can also be displayed, e.g. by a horizontal light emitting diode or LED chain 66. With the conductivities can be associated details concerning the material of the metal (e.g. austenitic iron, aluminium, etc.) usable for characterization and identification of mines. In the present example, the metal piece found is an iron piece. Consequently the material permeability could be indicated or displayed. Further signals derivable from the probe signal can correspond to the volume of the discovered, metallic search object (LED chain 67) and its vertical distance from the search coil (LED chain 68). For volume display purposes, use is made of the fact that the strength of a metal signal rises in characteristic manner with the volume excited by the alternating field. An indication of the depth of a discovered search object in the ground can e.g. be obtained in that the search coil system is preferably periodically moved backwards and forwards roughly perpendicular to the ground surface. This can take place manually or automatically by corresponding raising and lowering devices. Use can be made of the fact that the strength of a probe signal produced by a metal piece roughly decreases with the sixth power of the distance between the search coil system and the metal piece. An evaluation of conductivity data for several frequencies can be used for determining a signal reproducing the frequency dependence of the conductivity of the metal. This frequency dependence is also a metal-characterizing quantity and can be used for identifying the metal or for distinguishing between metal signals and ground signals.

The method is also suitable for searching for completely metal-free mines. A distinction with a harmless piece of metal, e.g. a sheet metal disk, which can produce a signal with a relatively large half-width and which roughly corresponds to the half-width of a plastic mine ground signal, can take place via the permeability and conductivity of the metal part. These parameters can be determined with the aid of the multifrequency method. In the case of a metal-free plastic mine the metal signal is equal to zero and signal 64 is substantially a straight line. This characteristic can be used for detecting metal-free plastic mines. It is merely necessary to ensure, e.g. by a contrast-increasing soil preparation by impregnation, that the soil has a minimum conductivity and/or minimum permeability, so that a plastic mine without a metal fraction is not overlooked. The minimum permeability and minimum conductivity of the soil can be determined and calculated and consequently taken into account as a result of the multifrequency method. The determinability and measurability of the conductivity and permeability can also be used for establishing the corresponding physical data of the excavation. An excavation filled with electrically non-conductive and non-magnetizable material, substantially in the same way as a metal-free excavation, has a permeability of I and a negligible conductivity. As opposed to this, these values are generally not reached in the case of soil inhomogeneities, so that there remains a minimum conductivity and/or minimum permeability. Thus, the multifrequency method makes it possible to distinguish between soil inhomogeneities and excavations filled with plastic material.

It is possible to determine an electromagnetic signature of the search object. By means of corresponding software, which can contain allocation or assignment tables with respect to mine types, the mine type can be determined and optionally displayed.

Control buttons 69 located on the display and control unit, can be used for setting corresponding gain factors for the described imaginary or real signals, so that for each selected mode the best ratio of wanted signal to spurious signal can be set. This can take place interactively with the aid of the display means. When using e.g. three excitation frequencies, it is possible to simultaneously produce a metal signal with optimum soil suppression and a signal with optimum soil detection. As shown in FIG. 4, the signals could be jointly displayed by a screen or corresponding LED strips. The representation shown permits a rapid spatial association of metal and ground signal and the detection of in particular plastic mines is facilitated and accelerated. The false alarm rate is drastically reduced, because in the case of metal pieces only producing a signal of type 61 and 65, the search can immediately be continued.

We claim:

1. Method for locating and identifying search objects concealed in the ground close to or under the surface thereof, a search object having at least one part made from electrically conductive material and a body made from substantially electrically non-conductive, non-magnetic material, the method comprising the following steps:

determining the position of the part;

investigating a search area surrounding the part by means of at least one ground probe, which is sensitive to the material of the ground and which produces a ground signal, wherein the step of investigating is performed inductively by means of said ground probe with at least one inductive search coil system; and spatially resolving evaluation of the ground signal.

2. Method according to claim 1, wherein the step of determining the position of the part is performed inductively by means of at least one metal probe, which has at least one inductive search coil system.

3. Method according to claim 1, wherein the step of investigating includes automatic scanning of the search area by the ground probe.

4. Method according to claim 1, wherein the step of investigating the search area is performed in such a way that the ground probe is moved relative to the search area substantially parallel to the ground surface along a search path containing the region of the part.

5. Method according to claim 4, wherein the ground probe is moved linearly in alternating manner in opposite directions.

6. Method according to claim 1, wherein the step of investigating the search area is performed in such a way that a ground probe with an inductive search coil system with at least two independently controllable transmitting coils and at least one receiving coil is positioned in fixed manner with respect to the search area, wherein the transmitting coils produce a spatially variable electromagnetic alternating field penetrating the ground of the search area and wherein the changes of the alternating field brought about by the ground are converted by the receiving coil into a ground signal correlated with the spatial change of the alternating field.

7. Method according to claim 1, wherein the evaluation of the ground signal is performed in such a way that the ground signal is automatically associated by a signal evaluating device connected in signal-transmitting manner to the ground probe with one of the ground probe position fixable by locating means and the orientation of the spatially variable alternating field and wherein the ground signal is transformed in an imaging step for providing at least one image of the search object.

8. Method according to claim 7, wherein the imaging of the search object is performed on a flat recording means, which has an imaging surface corresponding to the search area.

9. Method according to claim 1, wherein prior to the step of investigating the search area, at least one of the electrical conductivity and magnetizability of the ground is increased by impregnating the ground in the search area with a liquid that increases at least one of the electrical conductivity and magnetizability of the ground.

10. Method according to claim 9, wherein the liquid contains dissolved minerals.

11. Method according to claim 9, wherein the liquid is a dispersion of magnetic particles in water.

12. Method according to claim 9, wherein the impregnation of the ground is performed by at least one of spraying and watering the ground with the liquid.

13. Method according to claim 9, wherein the impregnation of the ground is performed from the air with the aid of an aircraft.

14. Method according to claim 1, wherein the step of investigating includes generating an electromagnetic alternating field penetrating the ground of the search area and detecting changes of the alternating field brought about by interaction of the alternating field with the ground.

15. Method for locating and identifying search objects concealed in the ground close to or under the surface thereof, a search object having a body made from substantially electrically non-conductive, non-magnetic material the method comprising the steps of:

investigating a search area by means of at least one inductive search coil system which is sensitive to the material of the ground and which produces a ground signal and;

spatially resolving evaluation of the ground signal.

16. Method according to claim 15, wherein a transmitting coil of the inductive search coil system is supplied with alternating current with at least two different discreet frequencies.

17. Method according to claim 15, wherein a transmitting coil of the inductive search coil system is supplied with alternating current with three different discreet frequencies.

18. Method according to claim 16, wherein at least one of the frequencies is more than 60 kHz.

19. Method according to claim 16, wherein at least one of the frequencies is of a low frequency type f0, f0 being lower than 1 kHz.

20. Detecting device for locating and identifying search objects concealed in the ground close to or below a ground surface, a search object having at least one part of an electrically conductive material and a body made from a substantially electrically non-conductive, non-magnetic material, the detecting device comprising at least one probe carrier, which has at least one metal probe sensitive to electrically conductive material and at least one inductive ground probe for generating a ground signal and constructed for investigating a search area surrounding the part, as well as a signal evaluating device connected in signal-transmitting manner with the ground probe for the spatially resolving evaluation of the ground signal.

21. Detecting device according to claim 20, wherein the ground probe is constructed for scanning the search area.

22. Detecting device according to claim 20, wherein at least one of the metal probe and the ground probe has at least one inductive search coil system with at least one transmitting coil and at least one receiving coil.

23. Detecting device according to claim 22, wherein the inductive search coil system of the metal probe and the inductive search coil system of the ground probe are formed by the same inductive search coil system.

24. Detecting device according to claim 22, wherein the transmitting coil of the search coil system is electrically connected to an exciting current source, which is constructed for producing alternating current of a discreet, first frequency and at least one dicreet, second frequency differing from the first frequency.

25. Detecting device according to claim 24, wherein at least three different frequencies are produced.

26. Detecting device according to claim 20, wherein the probe carrier has probe guidance means, which are constructed for guiding the ground probe, relative to the probe carrier, along a search path orientable substantially parallel to the ground surface.

27. Detecting device according to claim 26, wherein the probe guidance means have at least one of the group of at least one linear guide for the ground probe and at least one rotation element rotatable about a rotation angle of 360°, on which is located the ground probe.

28. Detecting device according to claim 26, wherein the probe guidance means comprise at least one belt drivable by a shaft and revolving parallel to a linear guide and having a laterally projecting bolt, which engages in a transverse groove on a search coil system carrier.

29. Detecting device according to claim 28, wherein at least one of the group of the belt and the bolt and the shaft are substantially made from non-magnetic, electrically non-conductive material.

30. Detecting device according to claim 28, wherein remote from the probe carrier of are provided driving means for the shaft.

31. Detecting device according to claim 20, wherein the probe carrier can be carried by a person.

32. Detecting device according to claim 20, wherein the probe carrier is fixed to a supporting rod.

33. Detecting device according to claim 32, wherein the supporting rod is internally hollow and wherein a shaft runs within the supporting rod from a driving means to the probe carrier.

34. Detecting device according to claim 20, wherein the probe carrier comprises a substantially closed casing, at least one search coil system being located within the casing.

35. Detecting device according to claim 20, wherein the probe carrier has downwardly projecting support means for the fixed attachment of the probe carrier and probes at a distance above the ground surface.

* * * * *